United States Patent
Huang et al.

(10) Patent No.: US 11,263,485 B2
(45) Date of Patent: Mar. 1, 2022

(54) TRANSFER MODEL TRAINING SYSTEM AND METHOD

(71) Applicant: INSTITUTE FOR INFORMATION INDUSTRY, Taipei (TW)

(72) Inventors: Tse-Yung Huang, Taipei (TW); Chin-Wei Tien, Taipei (TW); Shang-Wen Chen, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 168 days.

(21) Appl. No.: 16/701,092

(22) Filed: Dec. 2, 2019

(65) Prior Publication Data

US 2021/0150271 A1 May 20, 2021

(30) Foreign Application Priority Data

Nov. 14, 2019 (TW) .................... 108141439

(51) Int. Cl.
| | | |
|---|---|---|
| G06K 9/62 | (2006.01) | |
| G06K 9/46 | (2006.01) | |
| G06N 3/08 | (2006.01) | |
| G06N 3/04 | (2006.01) | |
| H04L 29/08 | (2006.01) | |
| H04L 67/00 | (2022.01) | |

(52) U.S. Cl.
CPC .......... G06K 9/6257 (2013.01); G06K 9/627 (2013.01); G06K 9/6264 (2013.01); G06N 3/082 (2013.01); H04L 67/34 (2013.01)

(58) Field of Classification Search
None
See application file for complete search history.

(56) References Cited

U.S. PATENT DOCUMENTS

| | | | | |
|---|---|---|---|---|
| 2017/0140253 A1* | 5/2017 | Wshah | ...................... | G06N 3/08 |
| 2018/0189612 A1* | 7/2018 | Liu | .......................... | G06Q 50/06 |
| 2019/0294923 A1* | 9/2019 | Riley | .................... | G06K 9/6256 |
| 2021/0019629 A1* | 1/2021 | Chidlovskii | ......... | G06K 9/6267 |

FOREIGN PATENT DOCUMENTS

| | | | | |
|---|---|---|---|---|
| CN | 107958286 A | * | 4/2018 | |
| CN | 107958286 A | | 4/2018 | |
| CN | 109919135 A | | 6/2019 | |
| CN | 110717426 A | * | 1/2020 | |
| CN | 111091131 A | * | 5/2020 | |
| WO | WO-2020243460 A1 | * | 12/2020 | ........... G06K 9/0061 |

OTHER PUBLICATIONS

The office action of the corresponding Taiwanese application dated Oct. 13, 2020.

* cited by examiner

*Primary Examiner* — Mohammed Rachedine
(74) *Attorney, Agent, or Firm* — CKC & Partners Co., LLC

(57) ABSTRACT

A system for training transfer models that includes a memory and a processor coupling to each other. The memory stores instructions. The processor accesses the instructions to retrieve raw datasets from a first-type device and train a feature extraction model, a transfer feature and a preliminary classify model based on the raw datasets. The processor further transfers the feature extraction model, the transfer feature and the preliminary classify model to a host of a manufacturer so that the host directly applies the feature extraction model and the transfer feature, and retrains the preliminary classify model as an adapted classify model based on practical datasets.

20 Claims, 8 Drawing Sheets

| | src_port | dest_port | proto | app_proto | tcp | age | bytes | max_ttl | pkts | spend_time |
|---|---|---|---|---|---|---|---|---|---|---|
| 0 | 0.129445 | 0.149238 | -0.659374 | 0.497094 | 0.659374 | -0.152560 | -0.071069 | -1.097229 | 0.057503 | -0.152052 |
| 1 | -0.454852 | 0.149238 | -0.659374 | 0.497094 | 0.659374 | -0.152560 | -0.071069 | -1.097229 | 0.057503 | -0.152018 |
| 2 | 0.692331 | 0.149238 | -0.659374 | 0.497094 | 0.659374 | -0.152560 | -0.071069 | -1.097229 | 0.057503 | -0.152060 |

Fig. 8A

| | 0 | 1 | 2 | 3 |
|---|---|---|---|---|
| 0 | -0.046589 | 0.433951 | 1.698470 | -3.079558 |
| 1 | 0.073370 | 0.314995 | 1.979603 | -3.313725 |
| 2 | -0.162151 | 0.548537 | 1.427638 | -2.853978 |
| 3 | 0.031751 | 0.356276 | 1.882074 | -3.232482 |

Fig. 8B

|   | src_port  | dest_port  | proto      | age       | bytes    | max_ttl  | pkts      |
|---|-----------|------------|------------|-----------|----------|----------|-----------|
| 0 | 1.330931  | -2.338814  | -87.811563 | -0.008191 | 0.047494 | 1.527124 | -0.008785 |
| 1 | 1.330931  | -2.338814  | -87.811563 | -0.008191 | 0.047494 | 1.527124 | -0.008785 |
| 2 | -2.451605 | -2.450537  | -87.811563 | -0.008191 | 0.730691 | 1.527124 | -0.008785 |

Fig. 9A

|   | 0         | 1        | 2         |
|---|-----------|----------|-----------|
| 0 | -0.784838 | 0.883831 | -3.093216 |
| 1 | -1.208518 | 4.801816 | -3.801793 |
| 2 | -0.516764 | 0.280755 | -4.363688 |

TRANSFER MODEL TRAINING SYSTEM AND METHOD

CROSS-REFERENCE TO RELATED APPLICATION

This application claims priority to Taiwan Application Serial Number 108141439, filed Nov. 14, 2019, which is herein incorporated by reference in its entirety.

BACKGROUND

Technical Field

The present disclosure relates to an electronic system and an operation method. More particularly, the present disclosure relates to a system and a method for training a transfer model.

Description of Related Art

The problem of system dependency or old system in traditional manufacturing results in the difficulty for maintaining the system. Therefore, many manufacturers have turned to intelligent production management system and real-time monitoring system, but it is possible for the intelligent system to run up against cyber-attack.

To prevent cyber-attack, the manufacturer can adopt traditional rule detection or new artificial intelligence detection. However, the rule detection is limited to the lack of adaptability of rules, and the artificial intelligence detection is limited to that a model is only adapted to a single device or a first manufacturer. Both have limitations and inefficiencies.

SUMMARY

In order to solve the aforementioned problems, the present disclosure provides the following transfer model training system and method.

One aspect of the present disclosure is related to a transfer model training system. The transfer model training system includes a memory and a processor, and the processor is communicatively coupled to the memory. The processor is configured to access an instruction stored in the memory to perform operations comprising: retrieving a raw dataset, wherein the raw dataset is collected from a first-type device; applying the raw dataset to train a feature extraction model, a transfer feature, and a preliminary classification model; and transferring the feature extraction model, the transfer feature, and the preliminary classification model to a host in a manufacturer, so that the host directly applies the feature extraction model and the transfer feature, and trains and modifies the preliminary classification model according to a practical dataset, so as to generate an adaptive classification model corresponding to the manufacturer, wherein the practical dataset is collected from a second-type device in the manufacturer, and the adaptive classification model is configured to determine whether an abnormality occurs in the second-type device.

Another aspect of the present disclosure is related to a transfer model training method. The transfer model training method includes: retrieving a raw dataset, wherein the raw dataset is collected from a first-type device; applying the raw dataset to train a feature extraction model, a transfer feature, and a preliminary classification model; and transferring the feature extraction model, the transfer feature, and the preliminary classification model to a host in a manufacturer, so that the host directly applies the feature extraction model and the transfer feature, and trains and modifies the preliminary classification model according to a practical dataset, so as to generate an adaptive classification model corresponding to the manufacturer, wherein the practical dataset is collected from a second-type device in the manufacturer, and the adaptive classification model is configured to determine whether an abnormality occurs in the second-type device.

Still other aspect of the present disclosure is related to a transfer model training system. The transfer model training system includes a manufacturer terminal, a platform terminal, and a training terminal. The platform terminal is communicatively between the manufacturer terminal and the training terminal. The manufacturer terminal is configured to collect a raw dataset from a device. The training terminal is configured to access an instruction to perform operations comprising: retrieving the raw dataset of the manufacturer terminal through the platform terminal; applying the raw dataset to train a feature extraction model, a transfer feature, and a preliminary classification model; and uploading the feature extraction model, the transfer feature, and the preliminary classification model to the platform terminal for the manufacturer terminal to access, so that the manufacturer terminal directly applies the feature extraction model and the transfer feature, and trains and modifies the preliminary classification model according to a practical dataset, so as to generate an adaptive classification model corresponding to the manufacturer terminal, wherein the practical dataset is collected from the device in different time, and the adaptive classification model is configured to determine whether an abnormality occurs in the device.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIG. 8A and FIG. 8B illustrate schematic views of standardized features and transfer features according to some embodiments of the present disclosure; and FIG. 9A and FIG. 9B illustrate schematic views of standardized features and transfer features according to some embodiments of the present disclosure.

DETAILED DESCRIPTION

Reference will now be made in detail to the present embodiments of the Those skilled in the art may make various changes, substitutions, and alterations herein without departing from the spirit and scope of the present disclosure.

The terms herein are used for describing particular embodiments and are not intended to be limited thereto. Single forms such as "a", "this", "the", as used herein also include the plurality form.

In the description herein and throughout the claims that follow, the terms "coupled" or "connected" in this document may be used to indicate that two or more elements physically or electrically contact with each other, directly or indirectly. They may also be used to indicate that two or more elements cooperate or interact with each other.

In the description herein and throughout the claims that follow, the terms "comprise" or "comprising," "include" or "including," "have" or "having," "contain" or "containing" and the like used herein are to be understood to be open-ended, i.e., to mean including but not limited to.

In the description herein and throughout the claims that follow, the phrase "and/or" includes any and all combinations of one or more of the associated listed claims.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
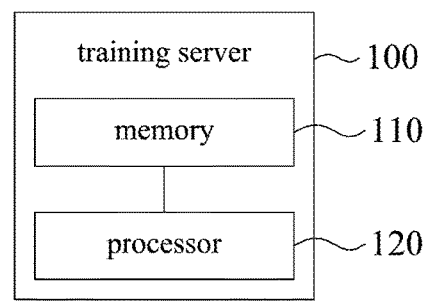
FIG. 1 illustrates a schematic view of a transfer model training system according to some embodiments of the present disclosure.

FIG. 1 illustrates a schematic view of a transfer model training system according to some embodiments of the present disclosure. As shown in FIG. 1, in some embodiments, the transfer model training system 100 may include a training server 100, and the training server 100 may include a memory 110 and a processor 120.

In some embodiments, the memory 110 may include, but is not limited to, a flash memory, a hard disk (HDD), a solid state hard disk (SSD), a dynamic random access memory (DRAM), or a static random access memory (SRAM). In some embodiments, the memory 110, as a non-transitory computer readable medium, stores at least one computer executable instruction, and the computer executable instruction is associated with a transfer model training method.

In some embodiments, the processor 120 may include, but is not limited to, a single processor and an integration of multiple microprocessors, such as a central processing unit (CPU) or a graphics processing unit (GPU). The processors (microprocessors) are electrically coupled to the memory, whereby the processor 120 can access the computer executable instruction from the memory 110 and execute a specific application program according to the computer executable instruction, so as to implement the aforementioned transfer model training method. In order to better understanding this method, the detailed operations are explained in the following paragraphs.

Figure 2:
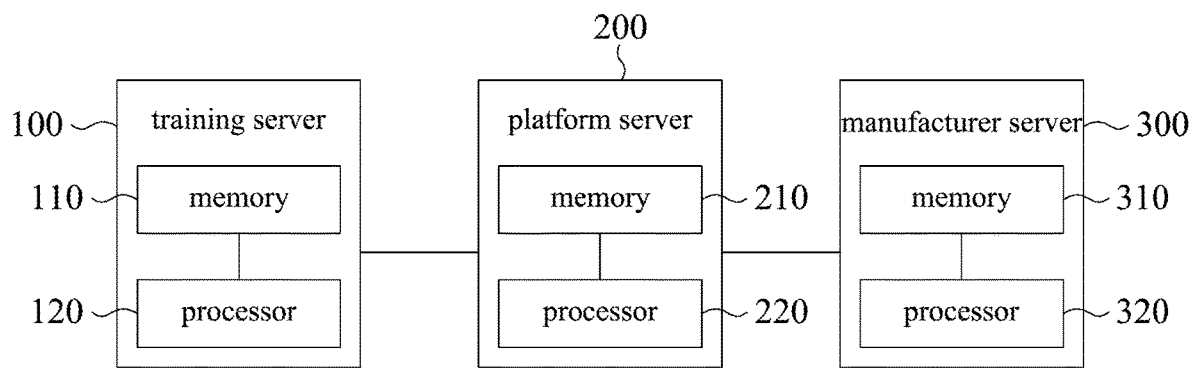
FIG. 2 illustrates a schematic view of a transfer model training system according to some embodiments of the present disclosure.

FIG. 2 illustrates a schematic view of a transfer model training system according to some embodiments of the present disclosure. As shown in FIG. 2, in some embodiments, the transfer model training system may include a training server 100, a platform server 200, and a manufacturer server 300. The training server 100, the platform server 200, and the manufacturer server 300 include respective memories 110,210,310 and processors 120,220,320. It should be understood that the implementations of the memories 110,210,310 and the processors 120,220,320 can be referred to the embodiment of FIG. 1, and the processor is configured to access instructions from the memory to execute a predetermined program.

As shown in FIG. 2, in some embodiments, the training server 100 can be communicatively coupled to the platform server 200, and the platform server 200 can be communicatively coupled to the manufacturer server 300. Accordingly, the platform server 200 serves as a medium between the training server 100 and the manufacturer server 300, so that the training server 100 and the manufacturer server 300 can exchange information bidirectionally.

It should be understood that the aforementioned "electrical coupling" or "communicatively coupling" may refer to a physical or non-physical coupling. For example, in some embodiments, the processor 120 can be coupled to the memory 110 through a physical line. In still other embodiments, the training server 100 can be coupled to the platform server 200 through network standard. However, the coupling manner of the present disclosure is not limited to the aforementioned embodiments.

Figure 3:
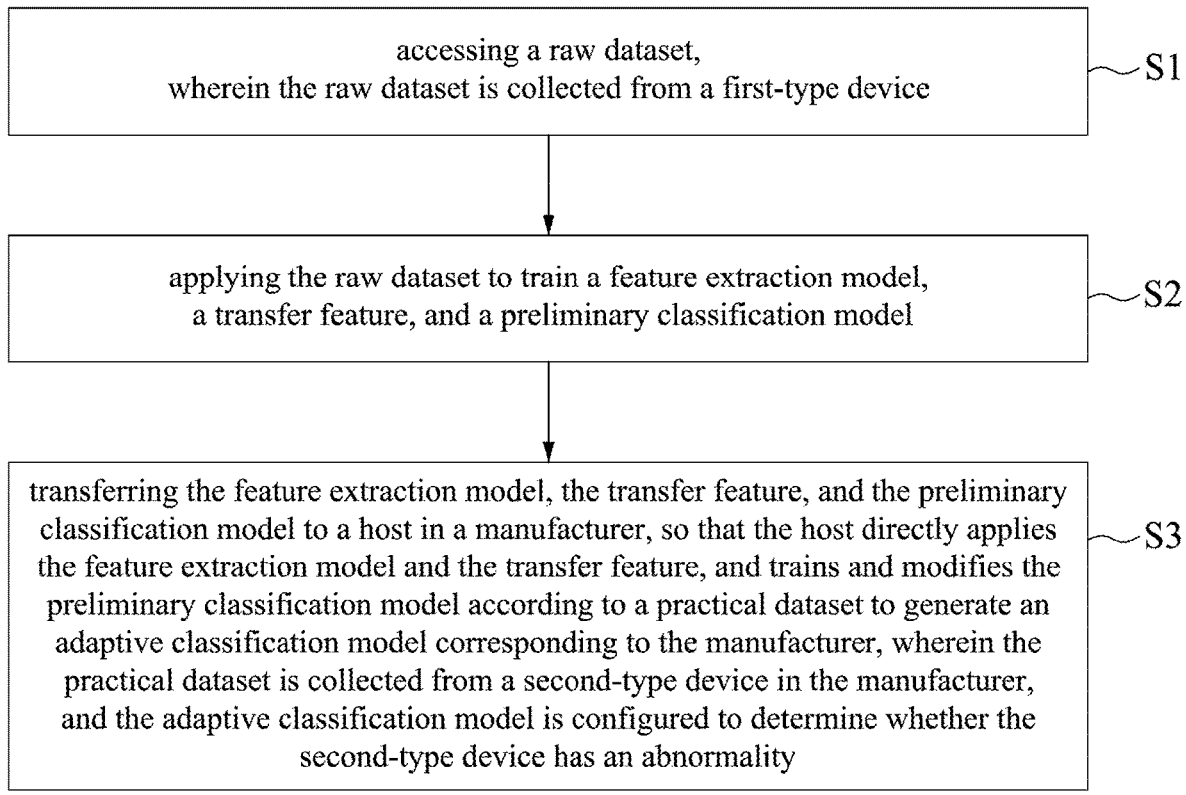
FIG. 3 illustrates a flow chart of operations of a transfer model training method according to some embodiments of the present disclosure.

FIG. 3 illustrates a flow chart of operations of a transfer model training method according to some embodiments of the present disclosure. As shown in FIG. 3, in some embodiments, the transfer model training method can be performed cooperatively by the training server 100, the platform server 200, and the manufacturer server 300 shown in FIG. 1 and FIG. 2. The detailed operations of the transfer model training method will be described in the following paragraphs.

Operation S1: A raw dataset is retrieved, in which the raw dataset is collected from a first-type device.

Figure 4:
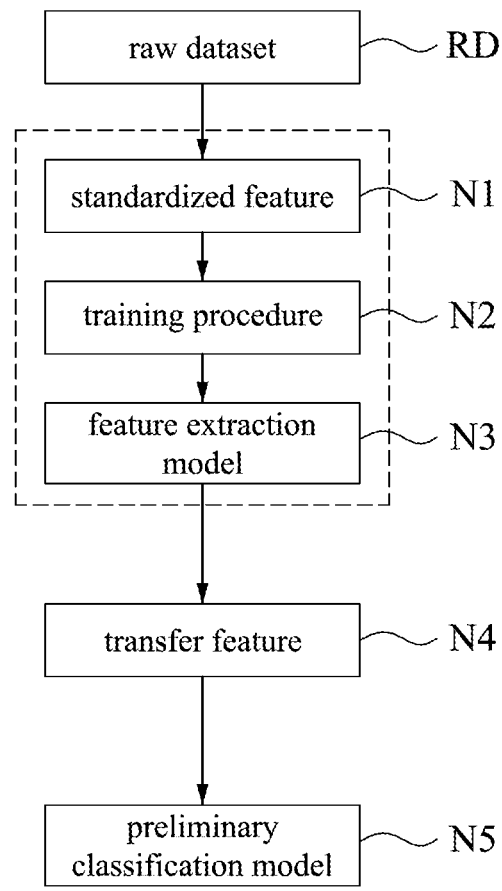
FIG. 4 illustrates a schematic view of a transfer model according to some embodiments of the present disclosure.

For a better understanding, reference is also made to FIG. 4, which illustrates a schematic view of a transfer model according to some embodiments of the present disclosure.

As shown in FIG. 4, in some embodiments, the manufacturer server 300 can be disposed in a specific manufacturer, such as a metal manufacturer, a semiconductor manufacturer, a chemical industrial manufacturer, or the like, which can be understood as a control host or a management host in the manufacturer. The processor 320 of the manufacturer server 300 can access the instructions in the memory 310, so that the processor 320 can collect various data of the specific machine (or called as device) under operation in the manufacturer to obtain a raw dataset RD. The processor 320 of the manufacturer server 300 can transmit/upload the raw dataset RD to the platform server 200, and the platform server 200 can store the raw dataset RD.

The aforementioned specific machine (or device) can have a fixed model/type (e.g., a robot arm, a handling device, a conveyor belt, etc.), but can perform the same or different operations (e.g., cutting, assembly, manufacturing, transporting, etc.) for the process in the manufacturer corresponding to the manufacturer server 300. The manufacturer server 300 can access various types of specific data (also called as standardized feature) from the controller of the machine, so as to obtain the raw dataset RD.

In some embodiments, the data (standardized feature) of the raw dataset RD may include source port data, destination port data, protocol data, approved protocol data, transmission control protocol (TCP) data, age data, byte data, packet number data, max time to live data, spend time data, etc., but the standardized feature that can be collected in the present disclosure are not limited thereto.

Operation S2: The raw dataset is applied to train a feature extraction model, a transfer feature, and a preliminary classification model.

In some embodiments, the training server 100 can be disposed in a particular location, such as an industrial security laboratory. The training server 100 can receive/download the raw dataset RD, which is collected by the manufacturer server 300, from the platform server 200. The training server 100 can analyze the raw dataset RD according to at least one standardized parameter to obtain standardized feature N1 associated with the specific machine. In some embodiments, the number of types of the standardized feature N1 can be A (e.g., 10 types, 7 types, etc.).

In some embodiments, the processor 120 of the training server 100 can input the standardized feature N1 of the raw dataset RD into a training procedure N2, and gradually extract and convert them into a mixed feature, which is the transfer feature N4. It should be understood that this whole fixed procedure of converting the standardized feature N1 into the transfer feature N4 can be understood as a type of feature extraction model N3 in which the dimensions are continuously descending (or reducing). In some embodiments, the number of types of the transfer feature N4 can be B (e.g., 4 types, 3 types, etc.). In general, the value of B is lower than the value of A. In other words, the feature extraction model N3 is configured to convert a greater number of the standardized feature N1 into a smaller number of the transfer feature N4.

Figure 5:
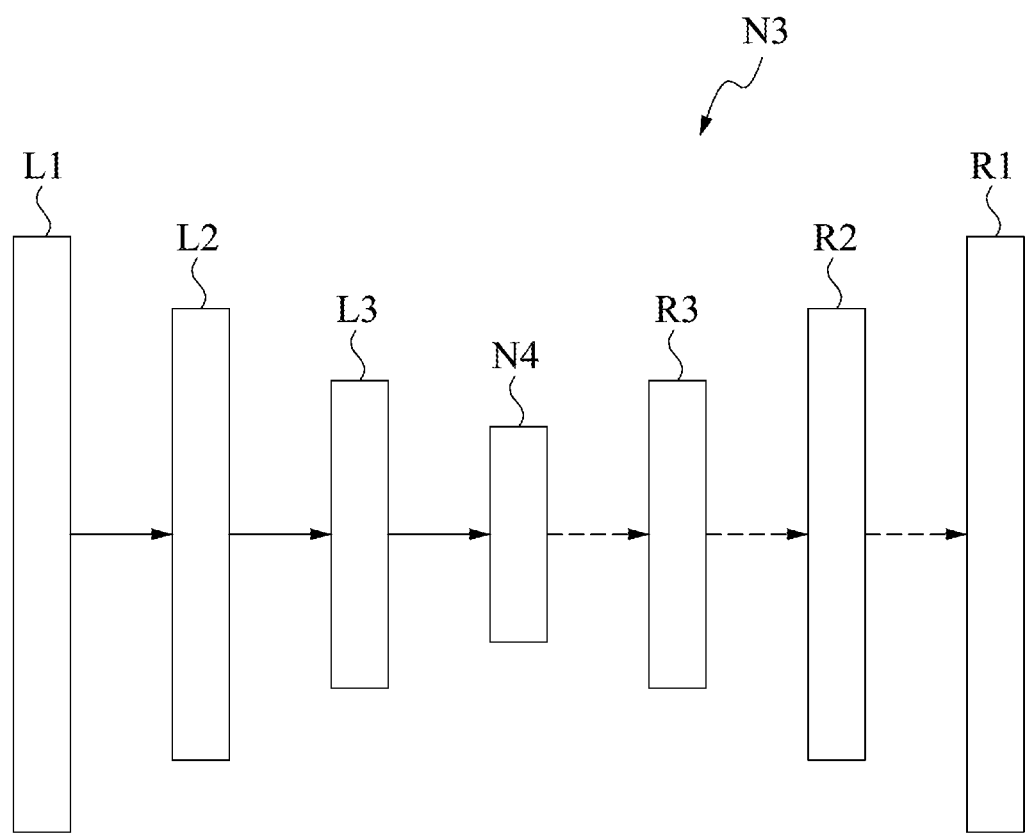
FIG. 5 illustrates a schematic view of a feature extraction model according to some embodiments of the present disclosure.

In some embodiments, a schematic view of the feature extraction model may be referred to FIG. 5. As shown in FIG. 5, the feature extraction model N3 may include a plurality of feature extraction layers L1-L3 which are connected to each other. Since the purpose of the feature extraction layers L1-L3 is to "extract" the features, the dimensions of each feature extraction layer are less than the dimensions of the previous feature extraction layer thereof.

In some embodiments, the feature extraction layers L1-L3 are followed by a computation layer which is corresponding to the transfer feature N4. The computation layer corresponding to the transfer feature N4 is followed by verification layers R1-R3, which can be understood as a plurality of reversed computation layers which are mainly configured to reverse the transfer feature N4 and verify whether the transfer feature N4 still keep enough representativeness of data after undergoing the extraction process of the feature extraction layers L1-L3.

As shown in FIG. 5, in some embodiments, before the computation layer corresponding to the transfer feature N4, each feature extraction layer has the dimensions twice that of the dimensions of the next feature extraction layer. In other words, the dimensions of the feature extraction layer L1 are twice that of the feature extraction layer L2, and the dimensions of the feature extraction layer L2 are twice that of the feature extraction layer L3. It can also be understood that the dimensions of the feature extraction layers L1-L3 of the feature extraction model N3 are gradually reduced, and the reduction ratio is one-half. In the present embodiment, when the dimensions of each feature extraction layer are twice that of the next feature extraction layer, the processor 120 of the training server 100 can discard the neurons in a more average manner (select one of every two neighboring neurons to be retained), or can use the average value of outputs of two neurons to enter the next computation layer to achieve better training results. In another embodiment, the dimensions of each feature extraction layer are 2K times the dimensions of the next feature extraction layer, in which K is any positive integer.

In some embodiments, the transfer feature N4 is a representative feature into which the standardized feature is converted through the feature extraction layers L1-L3. In general, the transfer feature N4 can be corresponding to a specific machine in the manufacturer where the manufacturer server 300 collects from. In some embodiments, the standardized feature collected from other machines having similar type/similar operation (or called as behaviors) may also be configured to obtain the feature extraction model N3 and the transfer feature N4 of the specific machine associated with of the manufacturer server 300 via the training procedure N2. That is, the present disclosure is not limited to collecting the standardized feature of the same machine. In other words, when there are two different types of device (not the same machine), which are applied to the similar operations, the same training procedure N2 can be used for different types of device having similar application operation to obtain the feature extraction model N3 and the transfer feature N4, whereby the training cost of generating the feature extraction model N3 and the transfer feature N4 can be reduced, and it has no need for the cost of establishing a similar model.

In some embodiments, the processor 120 of the training server 100 can continue to train a preliminary classification model N5 according to the transfer feature N4. The transfer feature N4 is followed by the preliminary classification model N5, which generally includes a fully connected layer configured for determining the result in the whole model. In accordance with the conditions pre-defined by the trainer, the fully connected layer can be used to output the ratio of the determination result (e.g., the ratio of "yes" is 0.7, and the ratio of "no" is 0.3), binary value (e.g., yes or no), or the like.

In general, the dataset, which is homogenous to the raw dataset RD (i.e., the standardized feature corresponding to the specific machine), is input to the feature extraction model N3. After undergoing the computation layer corresponding to the transfer feature N4 and the preliminary classification model N5, the determination result can be generated according to the dataset (corresponding to the specific machine). The determination result is, for example, whether the dataset is corresponding to the specific machine, whether the dataset represents that the machine has an abnormal condition, etc., but the present disclosure is not limited thereto.

Operation S3: The feature extraction model, the transfer feature, and the preliminary classification model are transferred to a host in a manufacturer, so that the host directly applies the feature extraction model and the transfer feature, and trains and modifies the preliminary classification model according to a practical dataset to generate an adaptive classification model corresponding to the manufacturer, in which the practical dataset is collected from a second-type device in the manufacturer, and the adaptive classification model is configured to determine whether an abnormality occurs in the second-type device.

In some embodiments, after the processor 120 trains and completes the feature extraction model N3, the transfer feature N4, and the preliminary classification model N5 according to the raw dataset RD, the processor 120 can transmit/upload the feature extraction model N3, the computation layer corresponding to the transfer feature N4, and the preliminary classification model N5 to the platform server 200, and the platform server 200 can store the feature extraction model N3, the computation layer corresponding to the transfer feature N4, and the preliminary classification model N5.

In some embodiments, the processor 320 of the manufacturer server 300 can download the feature extraction model N3, the computation layer corresponding to the transfer feature N4, and the preliminary classification model N5 (optionally) from the platform server 200. The processor 320 can use the feature extraction model N3 and the computation layer corresponding to the transfer feature N4 for the determination model of the manufacturer.

Figure 6:
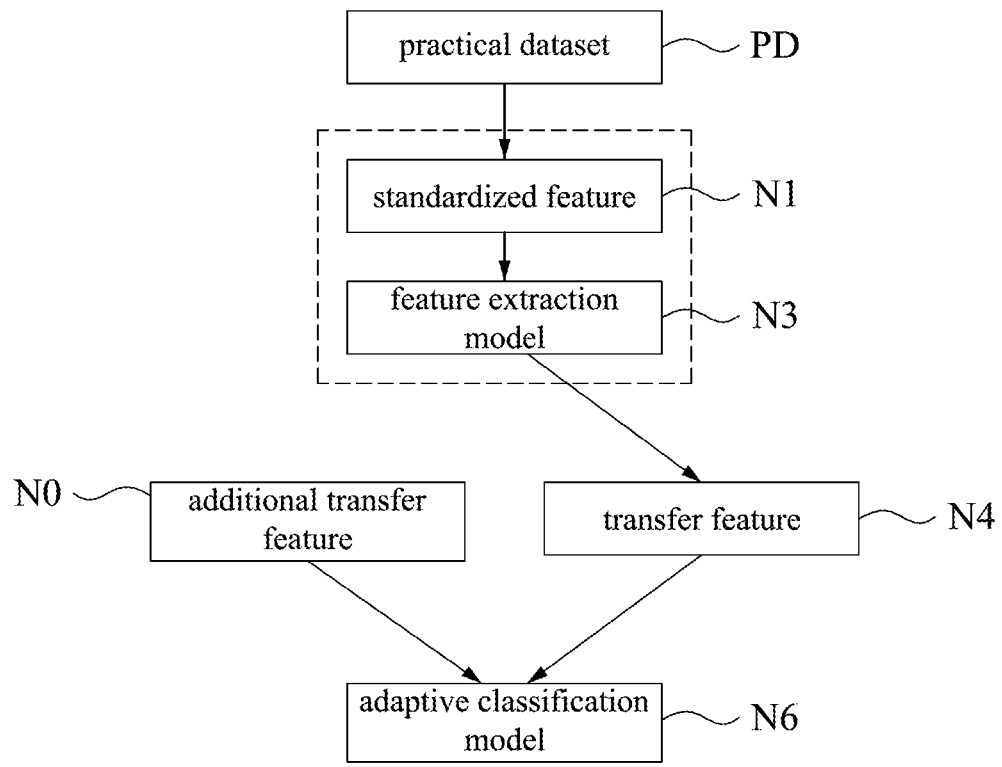
FIG. 6 illustrates a schematic view of a transfer model according to some embodiments of the present disclosure.

For a better understanding, reference is also made to FIG. 6, which illustrates a schematic diagram of a transfer model according to some embodiments of the present disclosure.

In some embodiments, the processor 320 of the manufacturer server 300 can re-collect the practical dataset PD from the specific machine in the manufacturer, the practical dataset PD is still corresponding to the standardized features N1 of the raw dataset RD, and the number of type of the practical dataset PD can be A. However, the collection time of the practical dataset PD is different from (e.g., later than) the collection time of the raw dataset RD.

In some embodiments, the processor 320 can directly input the practical dataset PD to obtain the data corresponding to the standardized feature N1, and then directly input them to the feature extraction model N3 to directly obtain the data corresponding to B types of the transfer feature N4. Subsequently, the processor 320 can train and modify the preliminary classification model N5, which is downloaded from the platform server 200, according to the data corresponding to the B types of the transfer feature N4, so as to generate the adaptive classification model N6 corresponding to the manufacturer. Accordingly, the processor 320 does not modify the feature extraction model N3 and the computation layer corresponding to the transfer feature N4, but only needs to train/modify the adaptive classification model N6, thereby greatly saving the whole training time.

In some embodiments, the processor 320 can optionally download the computation layer of additional transfer feature N0 from the platform server 200, so as to add more auxiliary features when training the adaptive classification model N6, thereby increasing the accuracy of the adaptive classification model N6.

Figure 7:
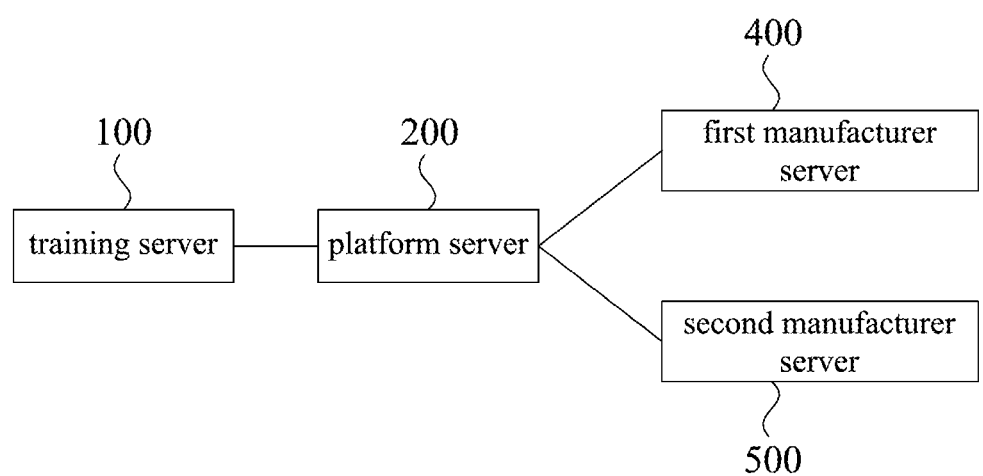
FIG. 7 illustrates a schematic view of a transfer model training system according to some embodiments of the present disclosure.

In order to better understand the additional transfer feature N0, reference is also made to FIG. 7, which illustrates a schematic view of a transfer model training system according to some embodiments of the present disclosure. As shown in FIG. 7, the training server 100 can be communicatively coupled to the platform server 200, and the platform server 200 can be communicatively coupled to a first manufacturer server 400 and a second manufacturer server 500. The first manufacturer server 400 and the second manufacturer server 500 can respectively obtain the collected datasets corresponding to specific machines (the same or different machines) in the manufacturer, and the datasets include the corresponding standardized features.

In some embodiments, the training server 100 can obtain the datasets of the first manufacturer server 400 and the second manufacturer server 500 through the platform server 200. According to the standardized features, the training server 100 can train and obtain the feature extraction model and the transfer feature corresponding to the first manufacturer server 400 and the feature extraction model and the transfer feature corresponding to the second manufacturer server 500. These feature extraction models and transfer features can be uploaded to the platform server 200.

According to the respective requirements of the first manufacturer server 400 and the second manufacturer server 500, the first manufacturer server 400 and the second manufacturer server 500 can respectively download the feature extraction model and the transfer feature (e.g., the feature extraction model N3 and the computation layer corresponding to the transfer feature N4 described in the aforementioned embodiments), which are trained according to the collected datasets in the manufacturers, from the platform server 200, and can further download the transfer feature (e.g., the aforementioned additional transfer feature N0), which is trained according to the collected dataset in other manufacturers.

It should be understood that the additional transfer feature N0 may be the transfer feature trained by the training server 100 according to the data collected from the same/similar machine in other manufacturer, or may be the transfer feature trained by the processor 120 of the training server 100 according to the data collected from the machine having the same/similar operations (or called as behaviors) in other manufacturer. In a preferred embodiment, adding the additional transfer feature N0 to the model training procedure can increase the accuracy of the adaptive classification model N6. In other words, the additional transfer feature N0 can assist in determining the operations (or called as behaviors) of the machines in the manufacturers where the first manufacturer server 400 and the second manufacturer server 500 are located.

In order to better understand the present disclosure, reference is also made to FIG. 8A to FIG. 8B and FIG. 9A to FIG. 9B, which illustrate schematic views of standardized features and transfer features according to some embodiments of the present disclosure.

In some embodiments, the standardized feature obtained by the processor 120 of the training server 100 (also the standardized feature collected by the processor 320 of the manufacturer server 300 for a specific machine) has ten dimensions.

As shown in FIG. 8A, the standardized features from left to right are source port data, destination port data, protocol data, approved protocol data, transmission control protocol data, age data, byte data, max time to live data, packet number data, and spend time data, respectively.

It should be understood that, in order to determine whether the machine is abnormal, the data collected by the processor 320 includes standardized feature data of the machine which operates normally, and also includes standardized feature data of the machine which runs up against an abnormal condition (e.g., denial of service attacks, specific viruses, system vulnerabilities, etc.). Accordingly, the processor 120 can obtain the machine data under normal and abnormal conditions, and the feature extraction model and the transfer feature trained thereby can be used to correctly distinguish the values corresponding to the abnormality of the machine.

In some embodiments, the transfer feature obtained by the processor 120 of the training server 100 through the feature extraction has four dimensions.

As shown in FIG. 8B, the transfer features from left to right are a first feature, a second feature, a third feature, and a fourth feature, respectively (represented by the number 0-3, respectively). It should be understood that the first to fourth features are the mixed features obtained by performing the cross-calculation on aforementioned ten types of standardized feature of FIG. 8A, each of them is not directly corresponding to a specific data of a specific machine.

Similarly, the embodiment shown in FIG. 9A to FIG. 9B is that the standardized feature having seven dimensions are trained to obtain the transfer feature having three dimensions. As shown in FIG. 9A, the standardized feature having seven dimensions from left to right are source port data, destination port data, protocol data, age data, byte data, max time to live data, and packet number data, respectively. The transfer feature having three dimensions from left to tight are the first feature, the second feature, and the third feature, respectively (represented by the number 0-2, respectively). What the standardized feature and the transfer feature mean is not further given herein.

It should be understood that the standardized features and transfer features described in the embodiments of FIG. 8A to FIG. 8B and FIG. 9A to FIG. 9B are merely examples, and the present disclosure is not limited thereto. The scope of the present disclosure should include various possible standardization features, and the transfer feature having the dimensions also can be calculated according to the requirement.

As described above, the raw dataset and the practical dataset obtained by the training server 100 include standardized feature data (equivalent to historical data) of a specific machine (or device) under normal and abnormal conditions, and thus the preliminary classification model N5 and the adaptive classification model N6 can be understood as a model for determining the data difference of the specific machine under normal and abnormal conditions. In a preferred embodiment, the preliminary classification model N5 obtained by the training server 100 and the adaptive classification model N6 obtained by the manufacturer server 300 (or the first manufacturer server 400 and the second manufacturer server 500) can correctly determine whether the specific machine has the abnormal condition (e.g., under attack, wrong operation, etc.).

As above, the transfer model training system of the present disclosure has at least one purpose that, after completing the transferable feature extraction model and the transfer feature in the training terminal according to the standardized features collected from the specific machine (or similar machine) in a plurality of manufacturers, the manufacturer terminal can directly transfer and apply the feature extraction model and the transfer feature, and can re-train/modify the subsequent classification model only according to the practical data, rather than re-executing the whole training, thereby greatly saving the time. In addition, the training terminal can collect the standardized feature of multiple manufacturers through the platform terminal, and the accuracy of the completed model is greater than the accuracy of the model trained by the single manufacturer.

It should be understood that in the aforementioned embodiments, the transfer model training system of the present disclosure has a plurality of functional blocks or modules. Those skilled in the art should understand that in some embodiments, the functional blocks or modules are preferably implemented by a specific circuit (including a specific circuit operated under one or more processors and coded instructions, or a general-purpose circuit). In general, the specific circuit may include a transistor or other circuit component configured in the manner of the aforementioned embodiments to enable the specific circuit to operate in accordance with the functions and operations described herein. Furthermore, functional blocks or inter-module cooperation programs in the specific circuit can be implemented by a specific compiler, for example, a register transfer language (RTL) compiler. However, the present disclosure is not limited thereto.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A transfer model training system, comprising:
a memory storing an instruction; and
a processor coupled to the memory, wherein the processor is configured to access the instruction to perform operations comprising:
retrieving a raw dataset, wherein the raw dataset is collected from a first-type device;
applying the raw dataset to train a feature extraction model, a transfer feature, and a preliminary classification model; and
transferring the feature extraction model, the transfer feature, and the preliminary classification model to a host in a manufacturer, so that the host directly applies the feature extraction model according to a practical dataset to generate data corresponding to the transfer feature, and trains and modifies the preliminary classification model according to the data corresponding to the transfer feature, so as to generate an adaptive classification model corresponding to the manufacturer;
wherein the practical dataset is collected from a second-type device in the manufacturer, and the adaptive classification model is configured to determine whether an abnormality occurs in the second-type device.

2. The transfer model training system of claim 1, wherein the first-type device and the second-type device are the same type of devices, and the first-type device and the second-type device are applied with different operations.

3. The transfer model training system of claim 1, wherein the first-type device and the second-type device are different types of devices, and the first-type device and the second-type device are applied with similar operations.

4. The transfer model training system of claim 1, wherein the processor analyzes the raw dataset according to at least one standardized parameter to obtain A types of standardized feature, and the processor converts the A types of standardized feature into B types of the transfer feature to generate the feature extraction model.

5. The transfer model training system of claim 4, wherein the value of A is greater than the value of B.

6. The transfer model training system of claim 4, wherein the feature extraction model at least comprises a first feature extraction and a second feature extraction layer which are continuous, and a first dimension of the first feature extraction layer is twice that of a second dimension of the second feature extraction layer.

7. The transfer model training system of claim 4, wherein the A types of standardized feature comprises source port data, destination port data, protocol data, transmission control protocol data, packet number data, and spend time data.

8. The transfer model training system of claim 1, wherein the first-type device is disposed in another manufacturer different from the manufacturer.

9. The transfer model training system of claim 1, wherein the first-type device is the second-type device, while the collection time of the raw dataset is different from that of the practical dataset.

10. A transfer model training method, comprising:
retrieving a raw dataset, wherein the raw dataset is collected from a first-type device;
applying the raw dataset to train a feature extraction model, a transfer feature, and a preliminary classification model; and
transferring the feature extraction model, the transfer feature, and the preliminary classification model to a host in a manufacturer, so that the host directly applies the feature extraction model according to a practical dataset to generate data corresponding to the transfer feature, and trains and modifies the preliminary classification model training according to the data corresponding to the transfer feature, so as to generate an adaptive classification model corresponding to the manufacturer,
wherein the practical dataset is collected from a second-type device in the manufacturer, and the adaptive classification model is configured to determine whether an abnormality occurs in the second-type device.

11. The transfer model training method of claim 10, wherein the first-type device and the second-type device are the same type of device, and the first-type device and the second-type device are applied with different operations.

12. The transfer model training method of claim 10, wherein the first-type device and the second-type device are different types of devices, and the first-type device and the second-type device are applied with similar operations.

13. The transfer model training method of claim 10, wherein applying the raw dataset to train the feature extraction model comprises:
analyzing the raw dataset according to at least one standardized parameter to obtain A types of standardized feature; and
converting the A types of standardized feature into B types of the transfer feature to generate the feature extraction model.

14. The transfer model training method of claim 13, wherein the value of A is greater than the value of B.

15. The transfer model training method of claim 13, wherein the feature extraction model at least comprises a first feature extraction and a second feature extraction layer which are continuous, and a first dimension of the first feature extraction layer is twice that of a second dimension of the second feature extraction layer.

16. The transfer model training method of claim 13, wherein the A types of standardized feature comprises source port data, destination port data, protocol data, transmission control protocol data, packet number data, and spend time data.

17. The transfer model training method of claim 10, wherein the first-type device is disposed in another manufacturer different from the manufacturer.

18. The transfer model training method of claim 10, wherein the first-type device is the second-type device, and the collection time of the raw dataset is different from that of the practical dataset.

19. A transfer model training system, comprising:
a manufacturer terminal configured to collect a raw dataset from a device;
a platform terminal communicatively coupled to the manufacturer terminal; and
a training terminal communicatively coupled to the platform terminal, wherein the training terminal is configured to access an instruction to perform operations comprising:
retrieving the raw dataset of the manufacturer terminal through the platform terminal;
applying the raw dataset to train a feature extraction model, a transfer feature, and a preliminary classification model; and
uploading the feature extraction model, the transfer feature, and the preliminary classification model to the platform terminal for the manufacturer terminal to access, so that the manufacturer terminal directly applies the feature extraction model according to a practical dataset to generate data corresponding to the transfer feature, and trains and modifies the preliminary classification model according to the data corresponding to the transfer feature, so as to generate an adaptive classification model corresponding to the manufacturer terminal,
wherein the practical dataset is collected from the device in different time, and the adaptive classification model is configured to determine whether an abnormality occurs in the device.

20. The transfer model training system of claim 19, wherein the training terminal analyzes the raw dataset according to at least one standardized parameter to obtain A types of standardized feature, the training terminal converts the A types of standardized feature into B types of the transfer feature to generate the feature extraction model, wherein the value of A is greater than the value of B.

* * * * *